United States Patent [19]

Takẽmura et al.

[11] Patent Number: 4,713,716

[45] Date of Patent: Dec. 15, 1987

[54] DETECTION DEVICE FOR CONTACT FUSION IN AN ELECTROMAGNETIC CONTACTOR

[75] Inventors: Koichi Takemura, Takatsuki; Tadashi Shiomi, Osaka, both of Japan

[73] Assignee: Kabushiki Kaisha Kamiuchi Denki Seisakusho, Osaka, Japan

[21] Appl. No.: 863,993

[22] Filed: May 15, 1986

[30] Foreign Application Priority Data

May 15, 1985 [JP] Japan ............................... 60-103160

[51] Int. Cl.⁴ ......................... H02H 3/00; H02H 7/00

[52] U.S. Cl. .......................................... 361/2; 361/23; 361/31

[58] Field of Search ..................... 361/1, 2, 23, 24, 30, 361/31, 33, 88, 91, 93–99

[56] References Cited

U.S. PATENT DOCUMENTS

| | | | |
|---|---|---|---|
| 2,647,232 | 7/1953 | Ransom et al. | 361/31 X |
| 3,413,520 | 11/1968 | Westbrook | 361/29 |
| 3,465,206 | 9/1969 | Harker et al. | 361/31 X |
| 3,902,105 | 8/1975 | Delaney et al. | 361/23 X |
| 3,932,789 | 1/1976 | Sons et al. | 361/31 |
| 4,000,446 | 12/1976 | Vanderier et al. | 361/31 |
| 4,114,054 | 9/1978 | Seo et al. | 361/56 X |
| 4,177,492 | 12/1979 | Noddings et al. | 361/31 |
| 4,306,265 | 12/1981 | Kuntner et al. | 361/31 |
| 4,354,214 | 10/1982 | Walton | 361/23 |
| 4,390,870 | 6/1983 | Michael | 361/23 X |
| 4,502,084 | 2/1985 | Hannett | 361/23 |
| 4,554,607 | 11/1985 | Mora | 361/23 X |
| 4,612,595 | 9/1986 | Gill et al. | 361/31 X |

*Primary Examiner*—A. D. Pellinen
*Assistant Examiner*—A. Jonathan Wysocki
*Attorney, Agent, or Firm*—Wenderoth, Lind & Ponack

[57] ABSTRACT

A detection device for contact fusion in an electromagnetic contactor in which an electric motor is connected by way of main contact of an electromagnetic contactor on the secondary side of a breaker equipped with electronic tripping device has a detection circuit for the voltage applied to the electromagnetic contactor coil connected in series with a pushbutton switch and a detection circuit for the voltage applied to the electric motor; a relay coil of a relay for detecting the contact fusion is connected to the tripping coil of the breaker and an ON-OFF element for supplying or interrupting the supply of an electrical current to the coil and a control circuit for the ON-OFF element are connected to the detection circuit for the voltage of the electrical motor both of the detection circuits are coupled with each other by a photocoupler, whereby the ON-OFF element is turned ON when the pushbutton switch is turned OFF in the case of the fusion of the main contacts, thereby exciting the relay coil to turn the detection relay for contact fusion to ON, by which the tripping coil is excited to trip the breaker so as to interrupt the operation of the electric motor.

4 Claims, 3 Drawing Figures

DETECTION DEVICE FOR CONTACT FUSION IN AN ELECTROMAGNETIC CONTACTOR

BACKGROUND OF THE INVENTION

1. Field of the Invention

This invention concerns a detection device for contact fusion which detects the contact fusion of main contacts in an electromagnetic contactor by detecting a voltage of main contacts on the load side and a voltage applied to an operation coil in an electromagnetic contactor for use which an induction motor conducting inching or plugging and which thereby tripping a breaker.

2. Description of the Prior Art

Heretofore, there has been known, as shown in FIG. 3, a detection device 10 for contact fusion in an electromagnetic contactor of the kind as described above having three current transformers 6, 7 and 8 and a logic circuit 9 including relay contacts 11 for detecting the contact fusion. In this device, a breaker 1 equipped with an electronic tripping device has three phase power supply terminals 41, 42, 43 on the primary side thereof which are connected respectively to R-phase, S-phase and T-phase of three phases. The secondary side of the breaker 1 is connected at the U-phase and at the V-phase by way of the primary side of the current transformers 7 and 8 respectively and at the W-phase directly, to the terminals of main contacts 3 of an electromagnetic contactor 12 connected at its other ends to an electric motor 4. Further, the U-phase on the secondary side of the breaker 1 is connected by way of the primary side of the current transformer 6, a pushbutton switch 5 and an operation coil 2 of an electromagnetic contactor 12 to the V-phase. Further, the logic circuit 9 is connected to the secondary side of the current transformers 6, 7, 8 and the relay contacts 11 for detecting the contact fusion that are opened and closed depending on the judgement of the logic circuit 9 are connected in series with the tripping coil 1*a* of the breaker 1 and disposed between the U- and V-phases on the secondary side of the breaker 1. If fusion has occurred in the main contacts 3 of the electromagnetic contactor 12, current flows through the current transformers 7 and 8 even if the pushbutton switch 5 is turned OFF, which is compared with the current transformer 6 in which no current flows when the pushbutton switch 5 is turned OFF by the logic circuit 9 to turn the relay contact 11 for the contact fusion as the result of the judgement thereby exciting the tripping coil 1*a* of the breaker 1 to trip the breaker 1, whereby the electrical motor 4 is stopped and the fusion in the main contacts 3 is detected. In the detection device for contact fusion in the electromagnetic contactor as described above, current transformers 6, 7, 8 are necessary for detecting the current flowing to the electric motor 4 and the current flowing to the operation coil 2 of the electromagnetic contactor 12, and the size of the current transformers 7 and 8 is enlarged along with the increase in the capacity of the electric motor 4 to make the detection device for contact fusion larger in the case of a large current electric motor 4. While on the other hand, the logic circuit 9 does not operate for a motor 4 with only a small current, thereby making it difficult to detect the fusion of the contacts.

SUMMARY OF THE INVENTION

According to this invention, in a circuit where an electric motor is connected to the secondary side of a breaker equipped with an electronic tripping device by way of main contacts of an electromagnetic contactor, a circuit for detecting a voltage applied to the electromagnetic contactor coil for actuating the main contacts of the electromagnetic contactor connected on the secondary side of the breakers by way of a pushbutton switch and a circuit for detecting a voltage applied to the electric motor are disposed, and a relay coil of a relay for detecting the contact fusion connected to the tripping coil of the breaker and an ON-OFF element for turning ON and OFF the current to the relay coil are connected in series with the circuit for detecting the voltage of the motor, while a light emitting diode of a photocoupler is connected to the circuit for detecting the voltage of the electromagnetic contactor; the phototransistor of the photocoupler is disposed in parallel with the control circuit for the ON-OFF element to the circuit for detecting the voltage of the motor, and the circuit for detecting voltage of the electromagnetic contactor coil and the circuit for detecting the voltage of the motor are connected by way of the photocoupler while electrically separated from each other.

Upon using the detection device for contact fusion according to this invention, in the case where the main contacts of the electromagnetic contactor are fused and a voltage is applied to the motor voltage detection circuit, even when the pushbutton switch is turned off, voltage is not applied on the voltage detection side of the electromagnetic contactor. In such a case, the light emitting diode of the photocoupler does not emit light so as to render the phototransistor on the side of the motor voltage detection circuit non-conductive and a current flows to the control circuit for the ON-OFF element to turn the ON-OFF element to ON, whereby the relay coil of the relay for the detection of contact fusion is excited to turn the relay ON, by which the tripping coil of the breaker is excited, thereby turning the breaker to OFF and thus enabling one to detect the contact fusion.

As described above, the object of this invention is to provide a device requiring neither transformers nor logic circuit as in the prior art and capable of overcoming the problems that the size of the current transformer is enlarged along with the electric motor capacity to increase the size of the detection device for contact fusion and that the logic circuit can not operate depending on the current flowing to the electric motor making it difficult to detect the contact fusion.

DESCRIPTION OF THE ACCOMPANYING DRAWINGS

The appended drawings show preferred embodiments of this invention, wherein

DETAILED DESCRIPTION OF THE INVENTION

This invention has been achieved in order to attain the foregoing purpose and the invention will now be described in more details referring to the accompanying drawings corresponding to the preferred embodiments.

Figure 1:
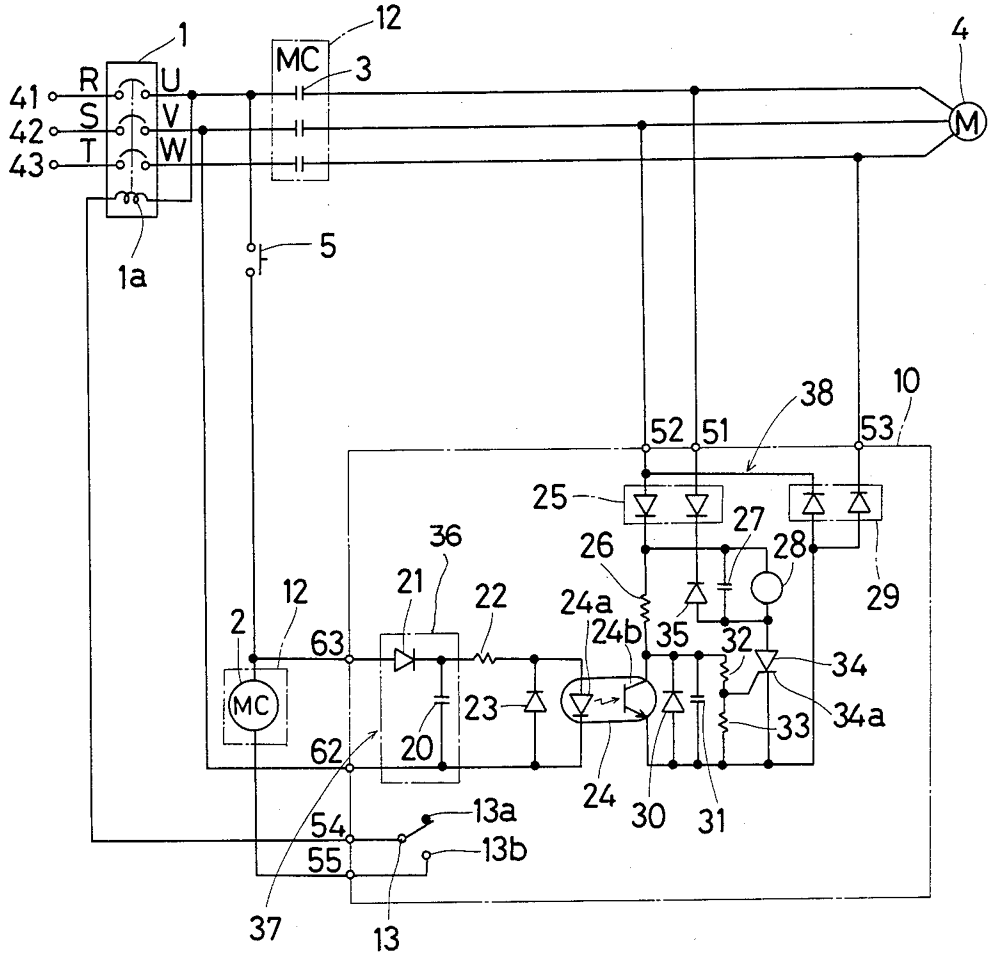
FIG. 1 is a circuit diagram for the device according to this invention.

FIG. 1 shows a circuit diagram for the embodiment so connected that an electric motor is operated singly, wherein are shown a breaker 1 equipped with electronic tripping device, having input terminals 41, 42, 43 on the primary side which are connected to the R-phase, S-phase, T-phase of a three phase power source respectively, while the U-phase, V-phase and W-phase on the secondary side thereof are connected to main contacts 3 of an electromagnetic contactor 12. An electromagnetic contactor coil 2 is connected by way of a pushbutton switch 5 between the U-phase and the V-phase on the secondary side of the breaker ahead of the main contact 3 respectively. An induction motor 4 has respective terminals connected to the main contacts 3 of the electromagnetic contactor 12. A relay 13 for the detection of contact fusion has a common contact connected to the detection contact terminal 54 of a detection device 10 for the detection of contact fusion, a normally closed contact 13*a* rendered opened and a normally open contact 13*b* connected to a detection contact terminal 55. The detection contact terminals 54 and 55 are connected by way of the tripping coil 1*a* of the breaker 1 between the U-phase and the V-phase on the primary side of the breaker 1 ahead of the main contacts 3. A photocoupler 24 is disposed within the detection device 10 for contact fusion, in which the light emitting diode 24*a* is connected by way of a current limiting resistor 22 to voltage detection terminals 63 and 62 of the detection device 10 in a detection circuit 37 for detecting the voltage of an electromagnetic contactor coil composed of a rectifying circuit 36 comprising a rectifying diode 21 and a smoothing capacitor 20. A check diode 23 is connected in parallel with the light emitting diode 24*a* of the photocoupler 24 so as to inhibit the supply of a reverse current to the light emitting diode 24*a*. A forward rectifying bridge 25 that constitutes a detection circuit 38 for the voltage of the motor is connected at the input terminals thereof with detection terminals 51 and 52 for the voltage of the motor in the detection device 10. The detection terminals 51 and 52 are connected to the U-phase and V-phase on the secondary side of the breaker 1 behind the main contacts 3, in which the W-phase is connected to the detection terminal 53 for the voltage of the motor in the detection device 10; the detection terminal 53 is connected to one of the output terminals of a reverse direction rectifying bridge in the same manner as in the rectifying bridge 29, while the other of the output terminals is connected to the detection terminal 52 of the rectifying bridge 25. A current limiting resistor 26 is disposed in series with the collector-emitter of the phototransistor 24*b* of the photocoupler 24 between the output terminal of the rectifying bridge 25 and the input terminal of the rectifying bridge 29 for controlling the current applied to the phototransistor 24*b*. A relay coil 28 for operating the relay 13 for the detection of contact fusion is connected in series with a forward thyristor as the ON-OFF element for causing current to flow through the relay coil 28 and further connected in parallel with the limiting resistor 26 and the phototransistor 24*b* of the photocoupler 24. A smoothing capacitor 27 is connected in parallel with the relay coil 28 for smoothing the current rectified in the rectifying bridge 25. A flywheel diode 35 is connected in parallel with the capacitor 27 and the relay coil 28. A reverse voltage check diode 30 and delay capacitor 31 are also provided. Current limiting resistors 32 and 33 are respectively connected to the phototransistor 24*b* of the photocoupler 24, and the junction between the limiting resistors 32 and 33 is connected to the gate 34*a* of the thyristor 34 as the ON-OFF element to constitute the control circuit for the thyristor 34. The delay capacitor 31 is inserted such that the main contacts 3 are turned ON after the phototransistor 24*b* of the photocoupler 24 is turned ON, and a voltage is applied between the gate 34*a* and the cathode of the thyristor 34 after the main contacts 3 are turned OFF.

Figure 2:
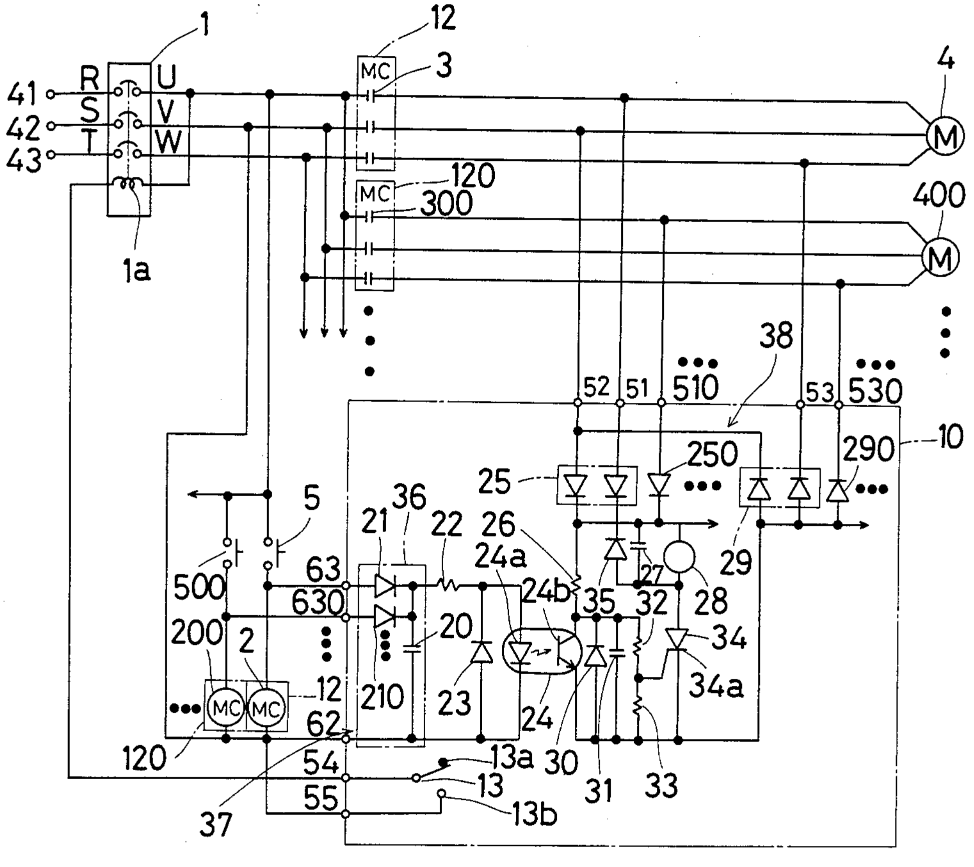
FIG. 2 is a circuit diagram for the device of the second embodiment thereof.
Figure 3:
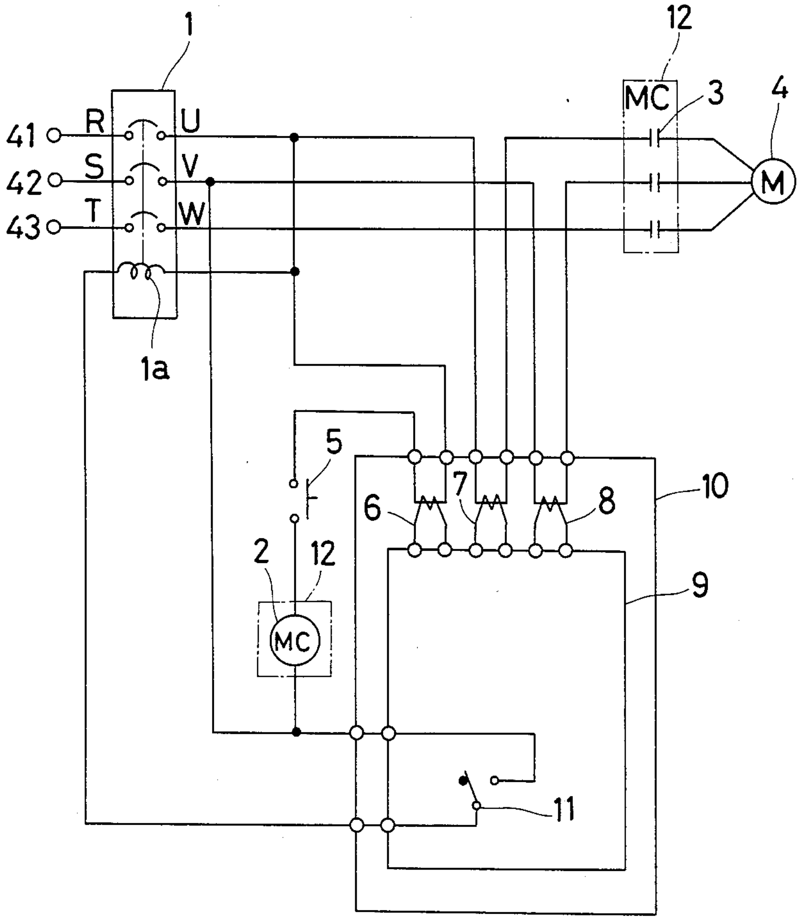
Fig. 3 PRIOR ART
FIG. 3 is a circuit diagram for the conventional device.

FIG. 2 shows a circuit diagram for the second embodiment connected such that a plurality of electric motors are operated. Extended induction motor 400 and the like are connected by way of main contacts 300 for extended electromagnetic contactor 120 and the like on the secondary side of the breaker 1 in parallel with the main contacts of the electromagnetic contactor 12 in the circuit of the embodiment shown in FIG. 1. Extended electromagnetic contactor coil 200 and the like, as well as extended pushbutton switch 500 and the like are connected between U- and W-phases and V-phase on the secondary side of the breaker 1 in parallel with the electromagnetic contactor coil 2 and with the push button switch 5 respectively shown in FIG. 1. Extended rectifying diode 210 and the like and extended rectifying bridge 250 and the like are additionally connected in the same manner as in FIG. 1 with the cathode sides thereof being in common with those of the rectifying diode 21 and the rectifying bridge 25. Further, extended rectifying bridge 290 and the like are additionally connected with the anode being in common with the rectifying bridge 29 in the same manner as in FIG. 1 on the W-phase of the secondary side (negative side) of the breaker 1 so as to obtain a plurality of outputs.

The operation of the device according to this invention will now be explained referring to FIG. 1. When the three-phase power supply is turned ON during normal state and the pushbutton switch 5 is turned ON, the electromagnetic contactor coil 2 for operating the electromagnetic contactor 12 is excited and, simultaneously, a voltage is applied between the voltage detection terminals 63 and 62 of the voltage detection circuit 37 for electromagnetic contactor coil 2, by which the light emitting diode 24*a* of the photocoupler 24 emits light to render the collector-emitter of the phototransistor 24*b* of the photocoupler 24 conductive. When the coil 2 is thus excited, the main contacts 3 of the electromagnetic contactor 12 are turned ON to operate the electric motor 4. In this case, while a voltage is applied to the detection terminals 51, 52, 53 for the motor voltage detection circuit 38, since the collector-emitter of the phototransistor 24*b* of the photo-coupler 24 is conducting, no current flows to the control circuit (thyristor gate) 34*a* of the ON-OFF element (thyristor) 34 to maintain the thyristor 34 to the OFF state. Thus, the relay coil 28 for the relay 13 for the detection of contact fusion is not excited and the common contact of the relay 13 is in connection with the normally closed contact 13*a* which is rendered open. Accordingly, the tripping coil 1*a* of the breaker 1 is not excited and the breaker 1 not tripped. Then, the motor 4 continues to operate. While on the other hand, by turning the push button switch 5 to OFF, the coil 2 is deenergized to render the main contacts 3 of the electromagnetic contactor 12 to OFF, whereby the electric motor 4 is stopped and normal operation is enabled. In a case where the main contacts 3 are fused and a voltage is applied to the motor voltage detection terminals 51, 52, 53 even if the pushbutton switch 5 is turned OFF, since the light emitting diode 24a of the photocoupler 24 does not emit light, the collector-emitter of the phototransistor 24b of the photo-coupler 24 is rendered non-conductive and a voltage is applied between the current limiting resistors 32 and 33. Then, a current flows to the gate 34a of the thyristor 34 and the thyristor 34 is turned ON to excite the relay coil 28 for the contact fusion detection relay 13. Then, the detection relay 13 is turned ON and the tripping coil 1a of the breaker 1 is excited, by which the breaker 1 is tripped and the electric motor 4 is stopped to enable the detection of the contact fusion.

The operation is the same for the embodiment shown in FIG. 2, wherein the breaker 1 equipped with electronic tripping device can be tripped when any of the main contacts 3, 300, - - - etc. of the electromagnetic contactors 12, 120, - - - corresponding to a plurality of electric motors 4, 400, - - - is fused and, accordingly, the contact fusion in the main contacts of the electric contactor corresponding respectively to the operation of the plurality of electrical motors can be detected.

The current transformers 7 and 8 have been used for detecting the current flowing through the electric motor 4 in the conventional detection device 10 for contact fusion, whereas in this invention having the foregoing constitution, since the motor voltage detection terminals 51, 52, 53 of the motor voltage detection circuit 38 of the contact fusion detection device 10 are connected to the behind of the main contacts 3, 300, - - - of the U, V and W-phases on the secondary side of the breaker 1 upon detection of voltage applied to the electric motors 4, 400, etc. the use of the current transformers 7 and 8 can be avoided, whereby the detection device can be used irrespective of the motor capacity, by which the structure of the contact fusion detection device 10 is rendered compact, no error signal is generated in view of the circuit structure and high reliability can be obtained.

Furthermore, since the voltage detection circuit 37 for the electromagnetic contactor coils 2, 200, - - - etc. corresponding to the main contacts 3, 300, - - - etc. for each of the electromagnetic contactors 12, 120, - - - etc. are connected by way of the photocoupler 24 to the voltage detection circuit 38 for the electric motors 4, 400, - - - etc. and separated electrically from each other, there are no restriction in view of the circuit structure with respect to each other.

What is claimed is:

1. A contact fusion detection device in an electromagnetic contactor used with an electric motor conducting inching or plugging, comprising:

an electromagnetic contactor having main contacts and electromagnetic contactor coil, said electromagnetic contactor coil operating said main contacts;

a detecting means for detecting a voltage supplied to said electromagnetic contactor coil, said detecting means being disposed ahead of said main contacts of said electromagnetic contactor;

a detecting means for detecting a voltage supplied to said electric motor, said detecting means being disposed after said main contacts of said electromagnetic contactor;

an ON-OFF means and a relay coil for contact fusion detection, said ON-OFF means supplying and interrupting the supply of an electrical current to said relay coil for contact fusion detection and comprising a portion of said detection means for detecting said motor voltage;

a photocoupler means for connecting said voltage detection means for detecting said voltage applied to said electromagnetic contactor coil to said voltage detection means for detecting said voltage applied to said electric motor;

said ON-OFF means including an ON-OFF control means, voltage changes across said electromagnetic contactor coil being supplied to said ON-OFF control means via said photocoupler means;

a breaker means having a tripping coil, said breaker means being connected between a source of power and said main contacts of said electromagnetic contactor;

a detection relay means connected to said tripping coil of said breaker and connected to said means for detecting said voltage applied to said electric motor, wherein said contact fusion detection relay means is operated so as to supply a voltage to said tripping coil of said breaker so as to thereby open said breaker upon the detection of contact fusion.

2. A contact fusion detection device as recited in claim 1, wherein said voltage detection means for detecting said voltage supplied to said electromagnetic contactor coil comprises a rectifying means having a rectifying diode and a smoothing capacitor, said rectifying means arranged across said electromagnetic contactor coil.

3. A contact fusion detection device as recited in claim 2, wherein said voltage detection means for detecting said voltage across applied to said electric motor comprises an additional rectifying bridge means disposed in a direction opposite to that of said rectifying bridge means after said main contacts of said electromagnetic contactor.

4. A contact fusion detection device as recited in claim 3, wherein said ON-OFF means comprises a thyristor having a gate which comprises said ON-OFF control means of said ON-OFF element.

* * * * *